United States Patent
Kim et al.

(10) Patent No.: US 7,321,563 B2
(45) Date of Patent: Jan. 22, 2008

(54) APPARATUS AND METHOD FOR ESTIMATING A CHANNEL CONDITION OF A FORWARD LINK IN A MOBILE COMMUNICATION SYSTEM

(75) Inventors: Youn-Sun Kim, Seongnam-si (KR); Dong-Hee Kim, Seoul (KR); Hwan-Joon Kwon, Gyeonggi-do (KR); Pan-Yuh Joo, Seoul (KR); Ho-Kyu Choi, Seongnam-si (KR)

(73) Assignee: Samsung Electronics Co., Ltd. (KR)

(*) Notice: Subject to any disclaimer, the term of this patent is extended or adjusted under 35 U.S.C. 154(b) by 724 days.

(21) Appl. No.: 10/752,388

(22) Filed: Jan. 6, 2004

(65) Prior Publication Data
US 2004/0141466 A1  Jul. 22, 2004

(30) Foreign Application Priority Data
Jan. 8, 2003  (KR) ................. 10-2003-0000993

(51) Int. Cl.
*H04J 1/16* (2006.01)
(52) U.S. Cl. ............ 370/252; 370/441; 455/114.2; 455/296
(58) Field of Classification Search ............ 370/252, 370/441, 332, 335; 455/63.1, 114.2, 278.1, 455/296
See application file for complete search history.

(56) References Cited

U.S. PATENT DOCUMENTS

| | | | |
|---|---|---|---|
| 2001/0040877 A1* | 11/2001 | Love et al. ............ | 370/329 |
| 2003/0103445 A1* | 6/2003 | Steer et al. ............ | 370/208 |
| 2003/0161285 A1* | 8/2003 | Tiedemann et al. ...... | 370/332 |
| 2004/0057394 A1* | 3/2004 | Holtzman .............. | 370/317 |
| 2004/0095906 A1* | 5/2004 | Rajkotia .............. | 370/332 |

* cited by examiner

*Primary Examiner*—CongVan Tran
(74) *Attorney, Agent, or Firm*—The Farrell Law Firm, PC

(57) ABSTRACT

A apparatus and method for estimating a channel condition of a forward link by a mobile station in a mobile communication system including the mobile station and a base station for performing an operation of transmitting/receiving data using a plurality of subcarriers having mutual orthogonality. The method comprises measuring carrier-to-interference ratio (C/I) values of the subcarriers using a signal received from the base station; determining from the received signal a subcarrier for transmitting feedback information in a given coherence bandwidth; generating feedback information to be transmitted over the determined subcarrier; and transmitting the generated feedback information to the base station as information for estimating a channel condition of the forward link.

41 Claims, 12 Drawing Sheets

| | Slot k | Slot k+1 | Slot k+2 | | | | | | | | | | TIME |
|---|---|---|---|---|---|---|---|---|---|---|---|---|---|
| Sc 0 | C | TD | TD | TD | TD | TD | TD | TD | TD | TD | C | TD | TD |
| Sc 1 | TD | C | TD | TD | TD | TD | TD | TD | TD | TD | TD | C | |
| Sc 2 | TD | TD | C | TD | TD | TD | TD | TD | TD | TD | TD | TD | C |
| Sc 3 | TD | TD | TD | C | TD | TD | TD | TD | TD | TD | TD | TD | TD |
| | TD | TD | TD | TD | C | TD | TD | TD | TD | TD | TD | TD | TD |
| ... | ... | ... | ... | ... | ... | ... | ... | ... | ... | ... | ... | ... | ... |
| Sc N-5 | TD | TD | TD | TD | TD | TD | TD | TD | C | TD | TD | TD | TD |
| | TD | TD | TD | TD | TD | TD | TD | TD | TD | C | TD | TD | TD |
| | C | TD | TD | TD | TD | TD | TD | TD | TD | TD | C | TD | TD |
| | TD | C | TD | TD | TD | TD | TD | TD | TD | TD | TD | C | TD |
| Sc N-1 | TD | TD | C | TD | TD | TD | TD | TD | TD | TD | TD | TD | C |

FREQUENCY

FIG.5

| | Slot k | Slot k+1 | Slot k+2 | ... | | | | | | | | | TIME |
|---|---|---|---|---|---|---|---|---|---|---|---|---|---|
| Sc 0 | FD/TD | FD/TD | FD | FD/TD | FD/TD | FD/TD | FD/TD | FD/TD | FD/TD | FD/TD | FD/TD | FD/TD | FD |
| Sc 1 | FD/TD | FD/TD | FD | FD/TD | FD/TD | FD/TD | FD/TD | FD/TD | FD/TD | FD/TD | FD/TD | FD/TD | FD |
| Sc 2 | TD | TD | C | TD | TD | TD | TD | TD | TD | TD | TD | TD | C |
| Sc 3 | FD/TD | FD/TD | FD | FD/TD | FD/TD | FD/TD | FD/TD | FD/TD | FD/TD | FD/TD | FD/TD | FD/TD | FD |
| | FD/TD | FD/TD | FD | FD/TD | FD/TD | FD/TD | FD/TD | FD/TD | FD/TD | FD/TD | FD/TD | FD/TD | FD |
| ⋮ | ⋮ | ⋮ | ⋮ | ⋮ | ⋮ | ⋮ | ⋮ | ⋮ | ⋮ | ⋮ | ⋮ | ⋮ | ⋮ |
| Sc N-5 | FD | FD/TD | FD/TD | FD/TD | FD/TD | FD/TD | FD/TD | FD/TD | FD/TD | FD | FD/TD | FD/TD | |
| | FD | FD/TD | FD/TD | FD/TD | FD/TD | FD/TD | FD/TD | FD/TD | FD/TD | FD | FD/TD | FD/TD | |
| | C | TD | TD | TD | TD | TD | TD | TD | TD | C | TD | TD | |
| | FD | FD/TD | FD/TD | FD/TD | FD/TD | FD/TD | FD/TD | FD/TD | FD/TD | FD | FD/TD | FD/TD | |
| Sc N-1 | FD | FD/TD | FD/TD | FD/TD | FD/TD | FD/TD | FD/TD | FD/TD | FD/TD | FD | FD/TD | FD/TD | |

COHERENCE BANDWIDTH = 5·Sc

FREQUENCY

FIG. 11

APPARATUS AND METHOD FOR ESTIMATING A CHANNEL CONDITION OF A FORWARD LINK IN A MOBILE COMMUNICATION SYSTEM

PRIORITY

This application claims priority under 35 U.S.C. § 119 to an application entitled "Apparatus and Method for Estimating Channel Condition of Forward Link in a Mobile Communication System" filed in the Korean Intellectual Property Office on Jan. 8, 2003 and assigned Serial No. 2003-993, the contents of which are incorporated herein by reference.

BACKGROUND OF THE INVENTION

1. Field of the Invention

The present invention relates generally to an apparatus and method for estimating a channel condition in a mobile communication system, and in particular, to an apparatus and method for estimating a channel condition of a forward link in an Orthogonal Frequency Division Multiplexing (OFDM) communication system using multiple carriers.

2. Description of the Related Art

Generally, an OFDM communication system is a multi-carrier transmission system that transmits data using several carriers that are orthogonal with each other. This system is distinguished from a single-carrier transmission system that transmits data using a single carrier. In such a multi-carrier transmission system, each carrier has a very short bandwidth and it is considerably affected by a variation in a channel. However, when it comes to the overall frequency band, in the case of a multipath interference channel, transmission carriers suffer reduction only in their amplitude due to a variation in the channel, so they can be satisfactorily recovered.

Commonly, in a radio communication environment, a condition of a forward channel is changed according to several factors such as velocity and a surrounding environment of a mobile station. In the OFDM communication system, adaptive transmission techniques for increasing system efficiency, such as PCR (Per Carrier Rate Control), AUA (Adaptive User Allocation), and Adaptive Modulation, are used in a base station according to such a time-varying channel condition. In order to use these adaptive techniques, it is necessary to estimate a condition of a forward channel. The forward channel condition can be estimated through a carrier-to-interference ratio (C/I). However, estimating a condition of a forward channel by a base station requires a process in which a mobile station measures C/I using a forward pilot channel by Frequency Division Duplexing (FDD) and feeds back the measured C/I to the base station.

In addition, because the OFDM communication system uses a plurality of subcarriers, feedback information used for feeding back information on a channel condition of each subcarrier greatly increases in quantity. Such feedback information transmitted via a reverse link serves as an overhead on the reverse link and greatly reduces efficiency of the reverse link.

SUMMARY OF THE INVENTION

It is, therefore, an object of the present invention to provide an apparatus and method for estimating a forward channel condition in an OFDM communication system.

It is another object of the present invention to provide an apparatus and method for estimating a forward channel condition without a reduction in efficiency of a reverse link in an OFDM communication system.

In accordance with one aspect of the present invention, there is provided a method for estimating a channel condition of a forward link by a mobile station in a mobile communication system including the mobile station and a base station for performing an operation of transmitting/receiving data using a plurality of subcarriers having mutual orthogonality. The method comprises the steps of measuring carrier-to-interference ratio (C/I) values of the subcarriers using a signal received from the base station; determining from the received signal a subcarrier for transmitting feedback information in a given coherence bandwidth; generating feedback information to be transmitted over the determined subcarrier; and transmitting the generated feedback information to the base station as information for estimating a channel condition of the forward link.

In accordance with another aspect of the present invention, there is provided a method for estimating a channel condition of a forward link by a base station in a mobile communication system including a mobile station and the base station for performing an operation of transmitting/receiving data using a plurality of subcarriers having mutual orthogonality. The method comprises the steps of: receiving feedback information from the mobile station over a feedback channel; estimating carrier-to-interference ratio (C/I) values of subcarriers in a given coherence bandwidth using the received feedback information; analyzing the estimated C/I values of the subcarriers according to a preset condition, and updating an accumulation value for estimating a channel condition of the forward link based on the analysis result; and estimating a channel condition of the forward link using the updated value.

In accordance with yet another aspect of the present invention, there is provided an apparatus for estimating a channel condition of a forward link by a mobile station in a mobile communication system including the mobile station and a base station for performing an operation of transmitting/receiving data using a plurality of subcarriers having mutual orthogonality. The apparatus comprises a forward link channel estimator for estimating carrier-to-interference ratio (C/I) values of the subcarriers using a received signal; a feedback information generator for determining from the estimated signal a subcarrier for transmitting feedback information in a given coherence bandwidth, and generating feedback information to be transmitted over the determined subcarrier; and a feedback channel for transmitting the generated feedback information to the base station as information for estimating a channel condition of the forward link.

In accordance with a further aspect of the present invention, there is provided an apparatus for estimating a channel condition of a forward link by a base station in a mobile communication system including a mobile station and the base station for performing an operation of transmitting/receiving data using a plurality of subcarriers having mutual orthogonality. The apparatus comprises a feedback channel receiver for estimating carrier-to-interference ratio (C/I) values of subcarriers in a given coherence bandwidth using feedback information received from the mobile station over a feedback channel; and a feedback information analyzer for analyzing the estimated C/I values of the subcarriers according to a preset condition, updating an accumulation value for estimating a channel condition of the forward link based on the analysis result, and estimating a channel condition of the forward link using the updated value.

BRIEF DESCRIPTION OF THE DRAWINGS

The above and other objects, features, and advantages of the present invention will become more apparent from the following detailed description when taken in conjunction with the accompanying drawings in which:

FIG. 5 is a diagram illustrating an example of feedback information generated according to the first embodiment of the present invention;

FIG. 11 is a diagram illustrating another example of feedback information generated according to the third embodiment of the present invention.

DETAILED DESCRIPTION OF THE PREFERRED EMBODIMENT

Figure 1:
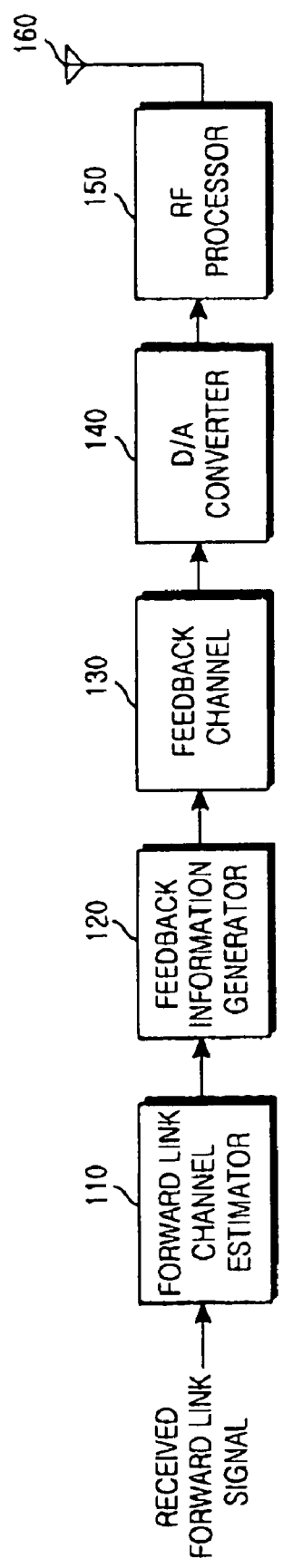
FIG. 1 is a block diagram illustrating an apparatus for estimating a channel condition of a forward link in a mobile station according to the present invention.

Several preferred embodiments of the present invention will now be described in detail herein below with reference to the annexed drawings. In the drawings, the same or similar elements are denoted by the same reference numerals even though they are depicted in different drawings. In the following description, a detailed description of known functions and configurations incorporated herein has been omitted for conciseness.

In the following description, the term "channel condition" or "forward channel condition" and the term "C/I" are used with the same meaning. In addition, the term "feedback information" refers to the information a mobile station generates and transmits to a base station so that the base station can estimate a forward channel condition. Herein, a principle of the present invention will first be presented, and then, several embodiments of the present invention will be described in detail.

Principle of the Invention

A principle of the present invention includes a process of estimating, by a mobile station, channel conditions of a plurality of carriers using a received signal, a process of generating feedback information using the estimated channel conditions according to a predetermined method, and a process of transmitting the feedback information to a base station.

The base station then receives the feedback information over a feedback channel, and estimates a forward channel condition using the received feedback information. Here, a method for generating feedback information depending on a forward channel condition is previously fixed in the base station and the mobile station.

FIG. 1 is a block diagram illustrating an apparatus for estimating a channel condition of a forward link in a mobile station according to the present invention. Referring to FIG. 1, a forward link channel estimator 110 included in the mobile station estimates a channel condition using a signal received from a base station. A forward feedback information generator 120 receives the channel condition estimation value, and generates feedback information based on the received channel condition estimation value in a predetermined method. The mobile station transmits the generated feedback information to the base station over a feedback channel 130. Here, the feedback channel 130 refers to a physical channel to which one subcarrier can be separately allocated for reverse signaling and one slot or one code can be allocated in a reverse channel. The output signal of the feedback channel 130 is converted from a digital signal to a baseband analog signal by digital-to-analog (D/A) converter 140. A RF processor 150 receives the output signal of D/A converter 140 and upconverts the baseband signal to an RF signal. The output of RF processor is transmitted to the base station by antenna 160.

Figure 2:
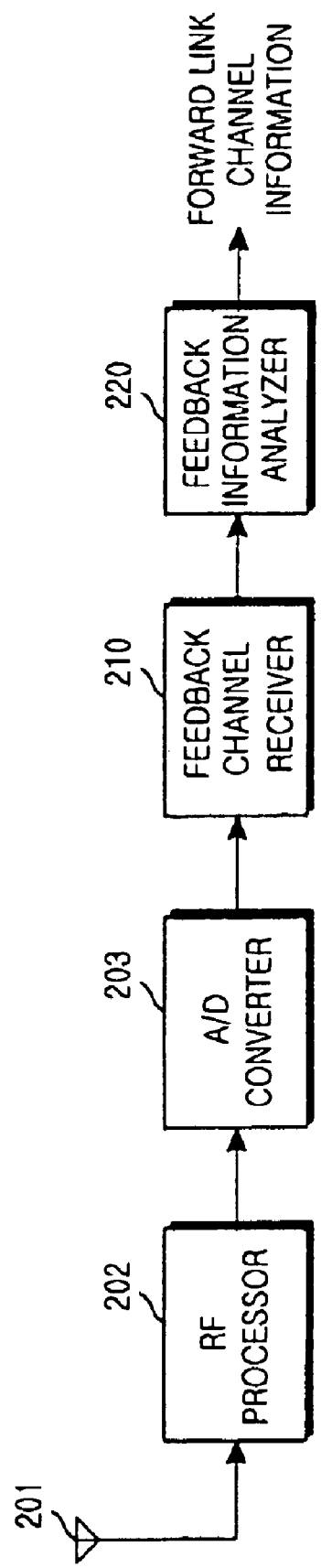
FIG. 2 is a block diagram illustrating an apparatus for estimating a channel condition of a forward link in a base station according to the present invention.

FIG. 2 is a block diagram illustrating an apparatus for estimating a channel condition of a forward link in a base station according to the present invention. Referring to FIG. 2, an antenna 201 receives the feedback channel including the feedback information. An RF processor 202 downconverts the RF signal received from the antenna to a baseband signal. An analog to digital converter 203 converts the baseband signal to a digital signal and transmits to feedback channel receiver.

A feedback channel receiver 210 in the base station receives feedback information over the feedback channel 130. A feedback information analyzer 220 analyzes the received feedback information, thereby estimating a channel condition of a current forward link.

Figure 3:
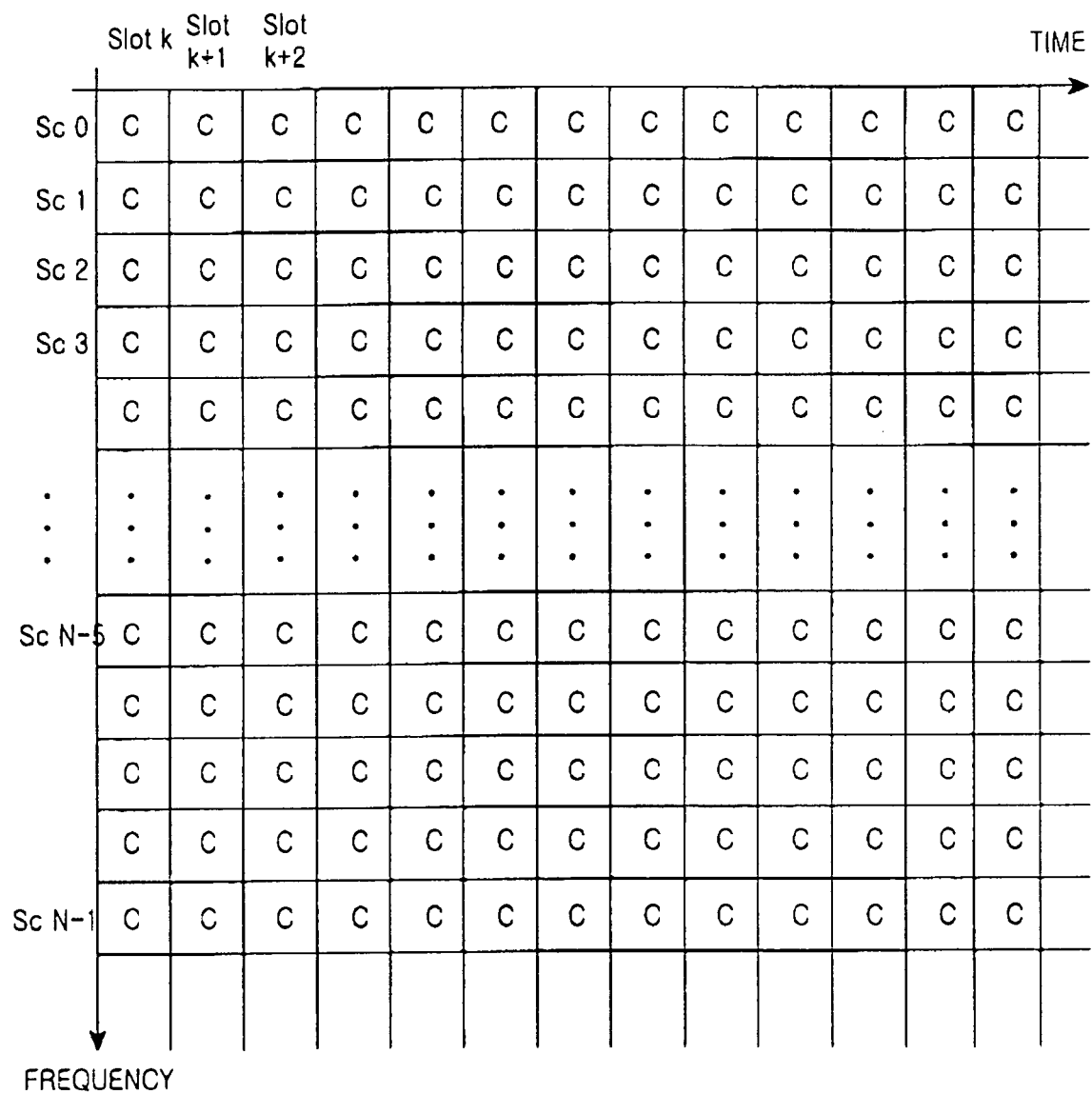
FIG. 3 is a diagram illustrating an example of feedback information generated according to the present invention.

FIG. 3 is a diagram illustrating an example of feedback information generated according to the present invention. In FIG. 3, a horizontal axis represents a time domain, or time slots, while a vertical axis represents a frequency domain, or subcarriers whose channel condition must be reported. A mobile station estimates a channel condition of each subcarrier. In FIG. 3, C denotes C/I, and the C/I is quantized as an 'nf' (number of feedback bit per subcarrier) bit before being transmitted. Therefore, when there are N subcarriers whose channel conditions must be reported, an amount of feedback information that must be reported for one slot becomes N×'nf' bit.

Embodiments

As illustrated in FIG. 3, in a method of estimating a channel condition by generating feedback information, an increase in number of subcarriers leads to a great increase in amount of feedback information. Herein, several embodiments capable of increasing efficiency of a reverse link by reducing an amount of feedback information will be described in detail with reference to the accompanying drawings.

In the following description, C represents C/I, and TD (Time differential feedback) represents a relative value of C/I information in a time domain. Here, the "relative value of a time domain" means a relative value for a C/I value measured at a previous time slot #(k−1), when a current time slot is defined as 'slot #k'. The relative value of the time domain will be referred to as a "TD value" or a "time-domain relative C/I," and the C will be referred to as a "full C/I" or a "reference C/I" in order to distinguish the C from the relative value of the time domain.

Figure 4:
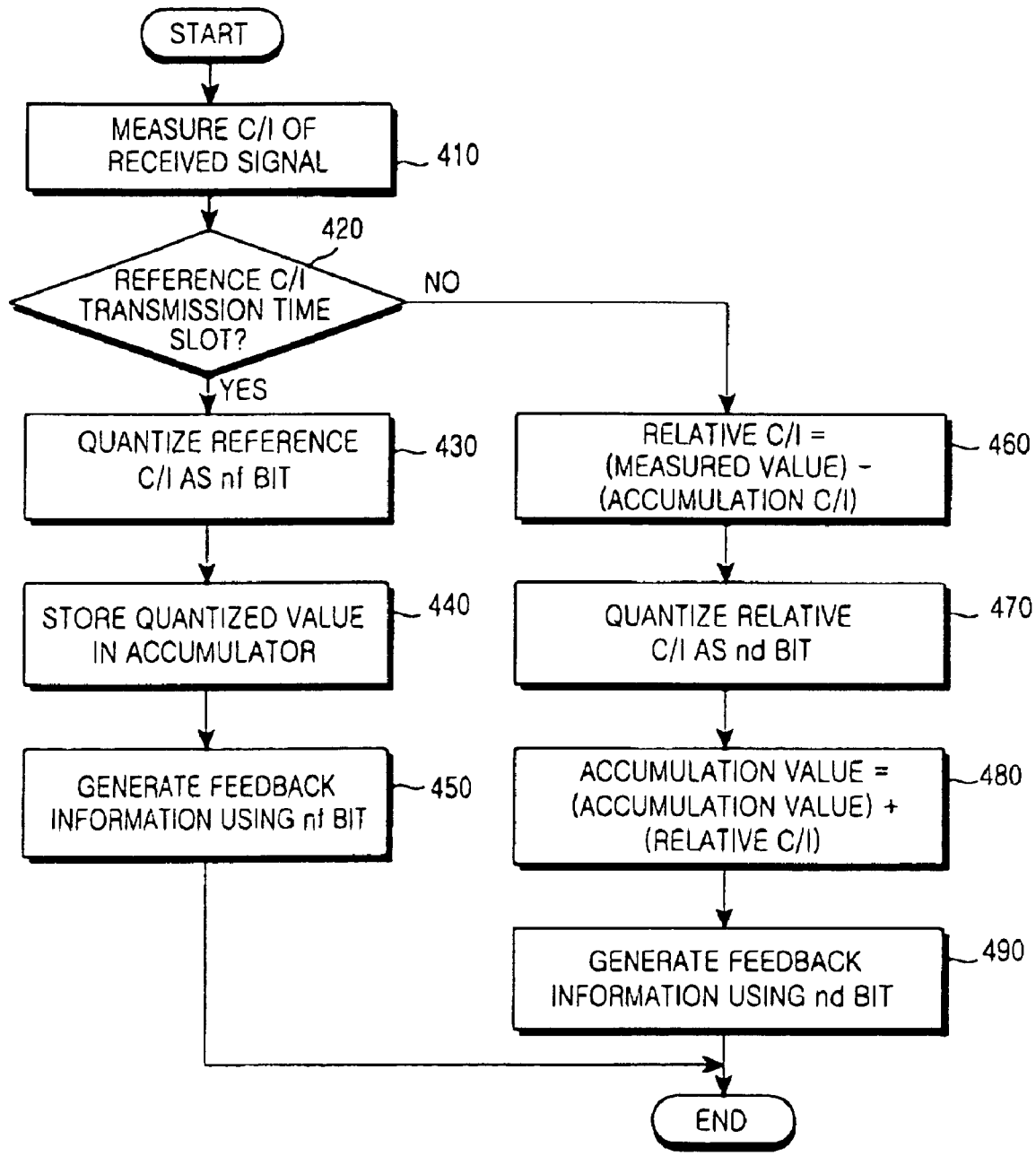
FIG. 4 is a flowchart illustrating a procedure for generating feedback information in a mobile station according to a first embodiment of the present invention.

FIG. 4 is a flowchart illustrating a procedure for generating feedback information in a mobile station according to a first embodiment of the present invention. In the present invention, the following feedback information generation procedure is independently performed on each subcarrier.

Referring to FIGS. 1 and 4, a mobile station measures a C/I through the forward link channel estimator 110 in step 410, and provides the measured C/I to the feedback information generator 120. The feedback information generator 120 then receives the measured C/I, and determines in step 420 whether a current time, or a time slot #k, is a reference C/I transmission time slot. If it is determined that the time slot #k is a reference C/I transmission time slot, the feedback information generator 120 quantizes the measured C/I value as a predetermined bit, i.e., 'nf' bit, in step 430. The feedback information generator 120 stores the quantized value in an accumulator (not shown) in step 440, and generates feedback information using the value stored in the accumulator in step 450.

However, if it is determined in step 420 that the current time slot is not a reference C/I transmission time slot, the feedback information generator 120 calculates a difference value between a C/I value previously stored in the accumulator and the measured C/I in step 460. In step 470, the feedback information generator 120 quantizes the calculated difference value as a predetermined bit, i.e., 'nd' (number of differential feedback bit per sub carrier) bit. In step 480, the feedback information generator 120 updates a value of the accumulator at the current time slot by adding the quantized difference value to the value previously stored in the accumulator. The updated value is used in determining a TD value at a next time slot #(k+1). Here, the 'nd' bit has a smaller value than that of the 'nf' bit. As a result, the use of the relative value contributes to a reduction in amount of feedback information that must be transmitted.

Thereafter, in step 490, the feedback information generator 120 generates feedback information using the value stored in the accumulator. The feedback information generator 120 generates feedback channel information by gathering feedback information of each subcarrier generated through the above processes. If it is assumed that feedback information is formed every time slot, a time at which a reference C/I is transmitted is uniquely allocated to each subcarrier in order to reduce an amount of feedback information.

An example of feedback information generated according to the first embodiment of the present invention is illustrated in FIG. 5, wherein the feedback information is formed every slot. When the method illustrated in FIG. 4 is used, TD can be expressed with a bit less than the 'nf' bit. Therefore, the use of the relative value leads to a reduction in amount of feedback information that must be transmitted.

If the mobile station generates feedback information through these processes and transmits the generated feedback information to a base station, then the base station estimates a forward channel condition using the transmitted feedback information. Such an operation of estimating a forward channel condition will be described with reference to the accompanying drawings.

Figure 6:
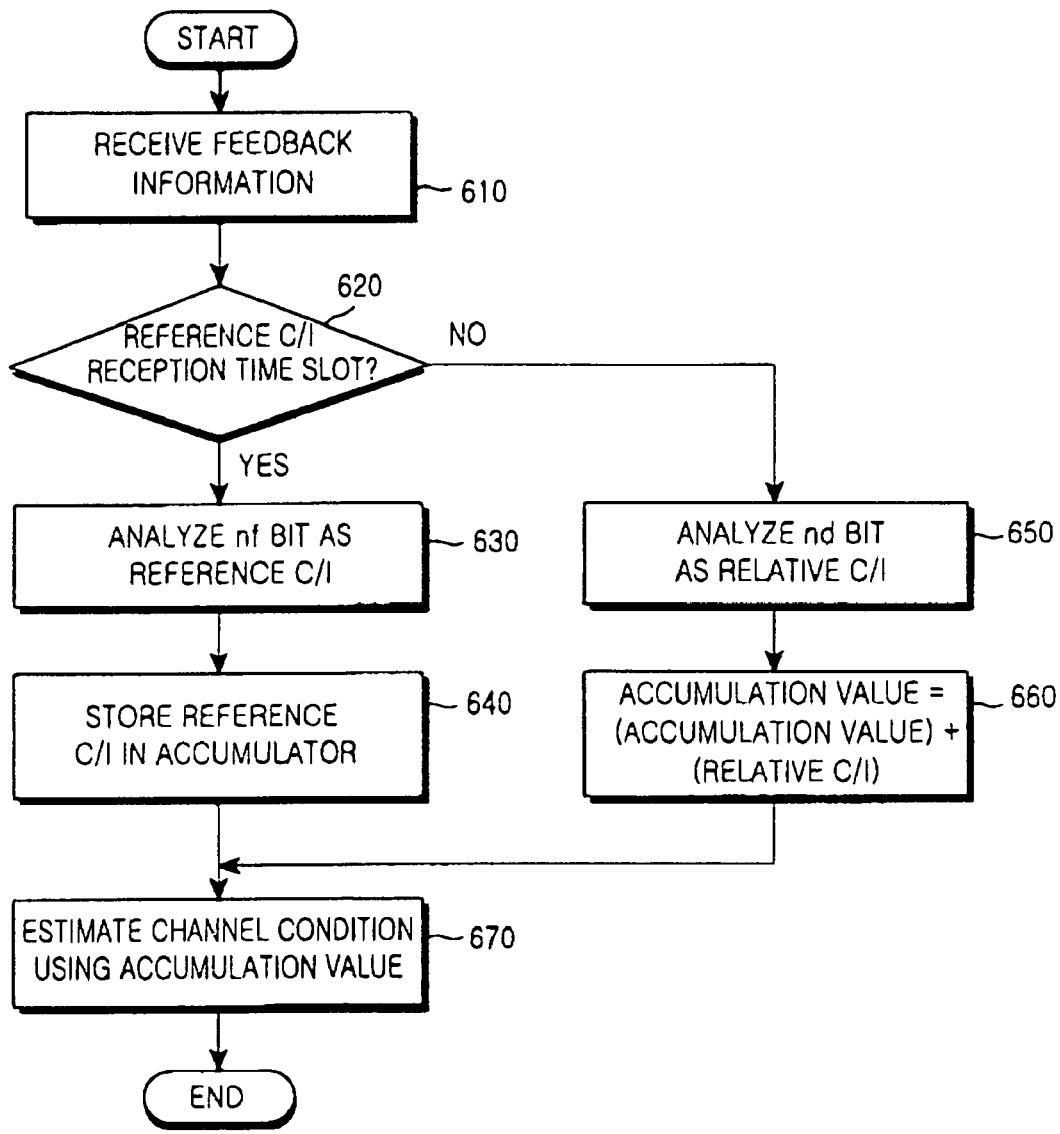
FIG. 6 is a flowchart illustrating a procedure for estimating a forward channel condition in a base station according to the first embodiment of the present invention.

FIG. 6 is a flowchart illustrating a procedure for estimating a forward channel condition in a base station according to the first embodiment of the present invention. Referring to FIGS. 2 and 6, a base station receives feedback information from a mobile station through the feedback channel receiver 210. In step 610, the feedback information analyzer 220 in the base station receives the received feedback information from the feedback channel receiver 210, and determines in step 620 whether a current time slot is a reference C/I reception time slot. If it is determined that the current time slot is a reference C/I reception time slot, the feedback information analyzer 220 receives an 'nf' bit and analyzes it as a reference C/I in step 630, and stores the reference C/I value in an accumulator (not shown) in step 640. However, if it is determined in step 620 that the current time slot is not a reference C/I reception time slot, the feedback information analyzer 220 analyzes a received 'nd' bit as a relative C/I in step 650. In step 660, the feedback information analyzer 220 updates a value of the accumulator at the current time slot by adding the relative C/I value to the accumulator's value.

In step 670, the feedback information analyzer 220 estimates a forward channel condition using a value stored in the accumulator. The values stored in the accumulators of the base station and the mobile station are maintained, and when a relative value is transmitted and received, a transceiver can detect a reference value.

The first embodiment of the present invention has provided a method of generating feedback information by generating a relative value TD of a time domain for each frequency and then comparing the relative value with a reference C/I. Next, a second embodiment of the present invention presents a method of generating feedback information using a coherence bandwidth.

Figure 7:
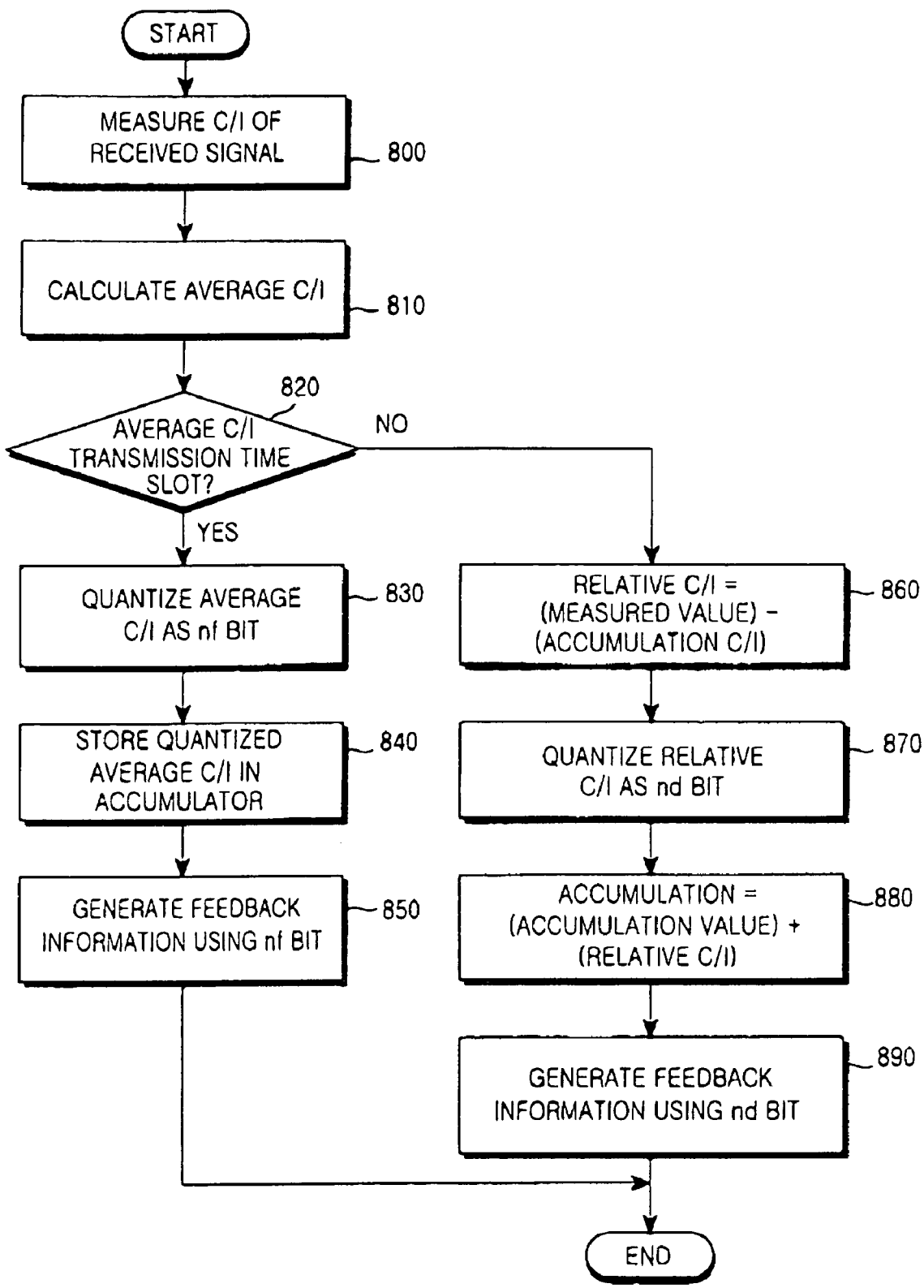
FIG. 7 is a flowchart illustrating a modified method for generating feedback information in a mobile station to a second embodiment of the present invention.

FIG. 7 is a flowchart illustrating a modified method of generating feedback information in a mobile station to a second embodiment of the present invention. It is assumed herein that a value determined by averaging C/I values of subcarriers in a given coherence bandwidth is defined as an average C/I instead of the reference C/I. In the present invention, the following procedure is independently performed on each coherence bandwidth.

Referring to FIGS. 1 and 7, a mobile station measures C/I values of subcarriers in a given coherence bandwidth using a received signal through the forward link channel estimator 110 in step 800, and provides the estimated C/I values to the feedback information generator 120. The feedback information generator 120 receives the measured C/I values, and calculates an average C/I value of the subcarriers for a particular time slot in step 810. Here, the "particular time slot" refers to a time slot at which the average C/I should be transmitted. In step 820, the feedback information generator 120 determines whether a current time slot is an average C/I transmission time slot. If it is determined that the current time slot is an average C/I transmission time slot, the feedback information generator 120 quantizes the measured average C/I value for the particular time slot as a predetermined bit, or 'nf' bit, in step 830, stores the quantized average C/I value in an accumulator in step 840, and generates feedback information using an 'nf' bit in step 850.

Alternatively, if it is determined in step 820 that the current time slot is not an average C/I transmission time slot, the feedback information generator 120 calculates a relative value TD of a time domain for the average C/I in steps 860 and 870. A process of determining a relative value TD of a time domain for the average C/I is identical to the TD value calculation process described above with reference to FIG. 4, so a detailed description thereof will be omitted for simplicity.

Figure 8:
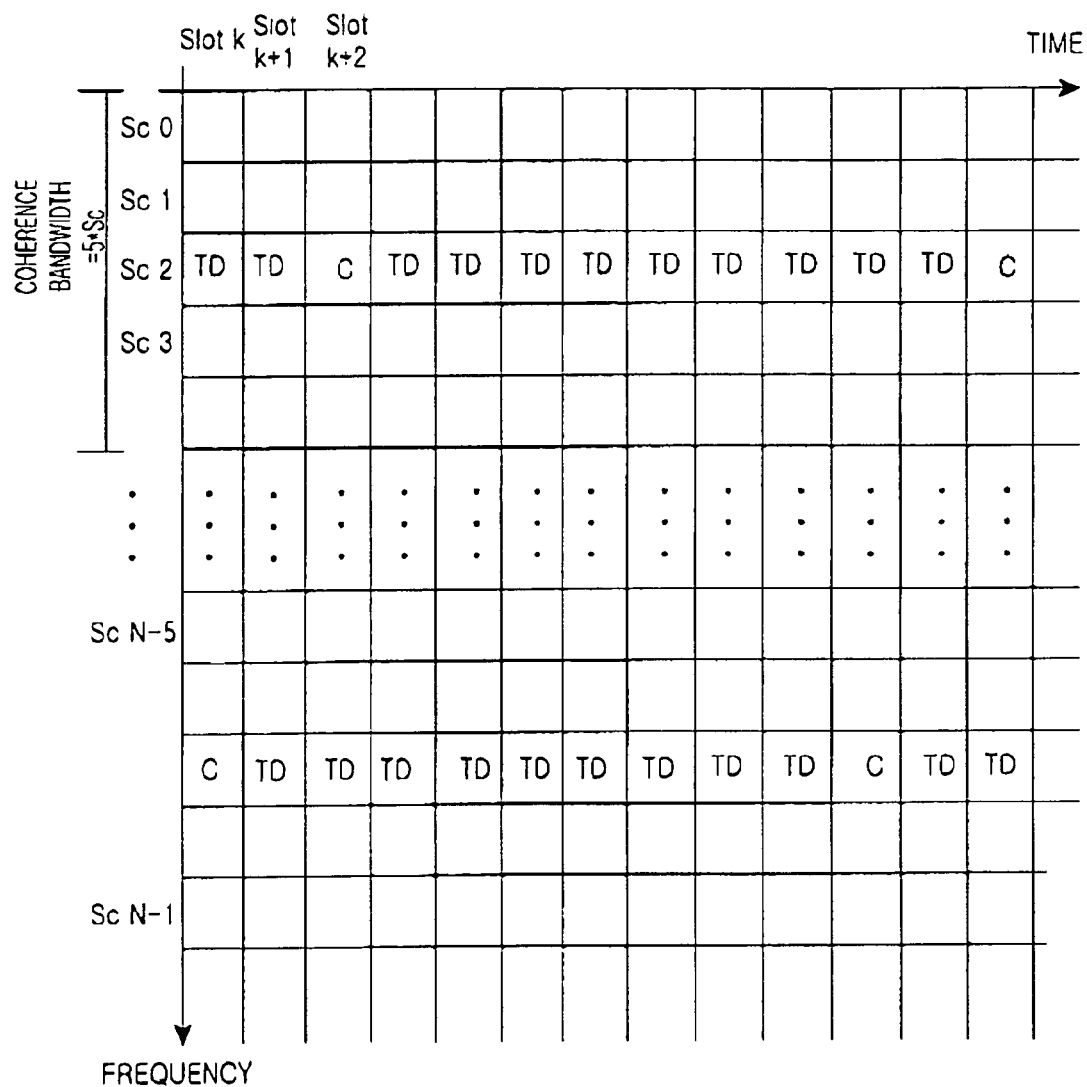
FIG. 8 is a diagram illustrating an example of feedback information generated according to the second embodiment of the present invention.

FIG. 8 is a diagram illustrating an example of feedback information generated according to the second embodiment of the present invention.

Conventionally, a system using a wideband suffers a frequency selective fading phenomenon in which a fading level depends upon a frequency. A fading level is constant between adjacent frequencies, but independent fading occurs when frequencies increase in a gap between them. If a correlation of a channel condition between two frequencies is calculated while increasing a gap between the two frequencies little by little, a correlation value is decreased step by step. Further, if the correlation value reaches a particular value, a difference between the two frequencies, determined at this moment, is defined as the coherence bandwidth. Fading has a similar value within the coherence bandwidth. However, interference due to neighboring cells/mobile stations can be different even within the coherence bandwidth. If it is assumed herein that the neighboring cells/mobile stations have a similar bandwidth, their interference levels will also have a specific correlation within the coherence bandwidth. In the following description, a frequency bandwidth where a forward channel condition, i.e., a C/I, including interference, has a predetermined correlation or above, is defined as a coherence bandwidth.

In a channel estimation method according to the second embodiment of the present invention, a mobile station first receives all subcarriers and measures C/Is of all the subcarriers. Next, the mobile station generates feedback information according to the measured C/Is and transmits the generated feedback information to a base station at one subcarrier.

The method for measuring a channel condition using the coherence bandwidth is as follows.

When a mobile station initially accesses a base station, the mobile station receives all subcarriers and measures C/Is of all subcarriers. Thereafter, the mobile station determines a particular coherence bandwidth and selects a subcarrier that will transmit feedback information. After, the mobile station measures only a C/I of a predetermined subcarrier instead of measuring C/Is of all subcarriers and transmit the measured C/I. A detailed description will now be made of the method for estimating a channel condition using the coherence bandwidth, giving specific examples.

In an example illustrated in FIG. 8, it is assumed that a coherence bandwidth has a width of 5 subcarriers. Assuming that subcarriers within the coherence bandwidth have similar channel conditions, feedback information can be formed using only one C/I value representing a condition of a subcarrier group consisting of 5 subcarriers.

Referring to FIG. 8, feedback information is formed using a C/I of a $3^{rd}$ subcarrier Sc3 out of the 5 subcarriers, as a reference C/I. Alternatively, however, the feedback information can be formed using a value determined by averaging C/I values of the 5 subcarriers, or a value capable of best representing a characteristic of a corresponding subcarrier group according to a system, such as a C/I value of a $1^{st}$ subcarrier, instead of using the reference C/I value. In addition, as illustrated in FIG. 8, even when one piece of feedback information is formed for a subcarrier group, the feedback information can be formed using the above-described relative value, i.e., TD, of the time domain. That is, TD values of the $3^{rd}$ subcarrier Sc3 represent the values determined by analyzing a received 'nd' bit as a relative C/I value at a previous time slot and then updating a value of an accumulator by adding a relative C/I value at the previous time slot to the value of the accumulator at the current time slot, and are used in forming feedback information.

As described above, the second embodiment of the present invention provides a method for generating feedback information using a coherence bandwidth and a time-domain relative value. Next, a third embodiment of the present invention will present a method of generating feedback information using a frequency-domain relative value in addition to the coherence bandwidth and the time-domain relative value. In the following description, the term "frequency-domain relative C/I" or "FD (Frequency differential feedback)" refers to a frequency-domain relative value for a reference C/I value of a subcarrier intending to feed back the reference C/I value at a corresponding time slot among subcarriers in the same subcarrier group.

Figure 9:
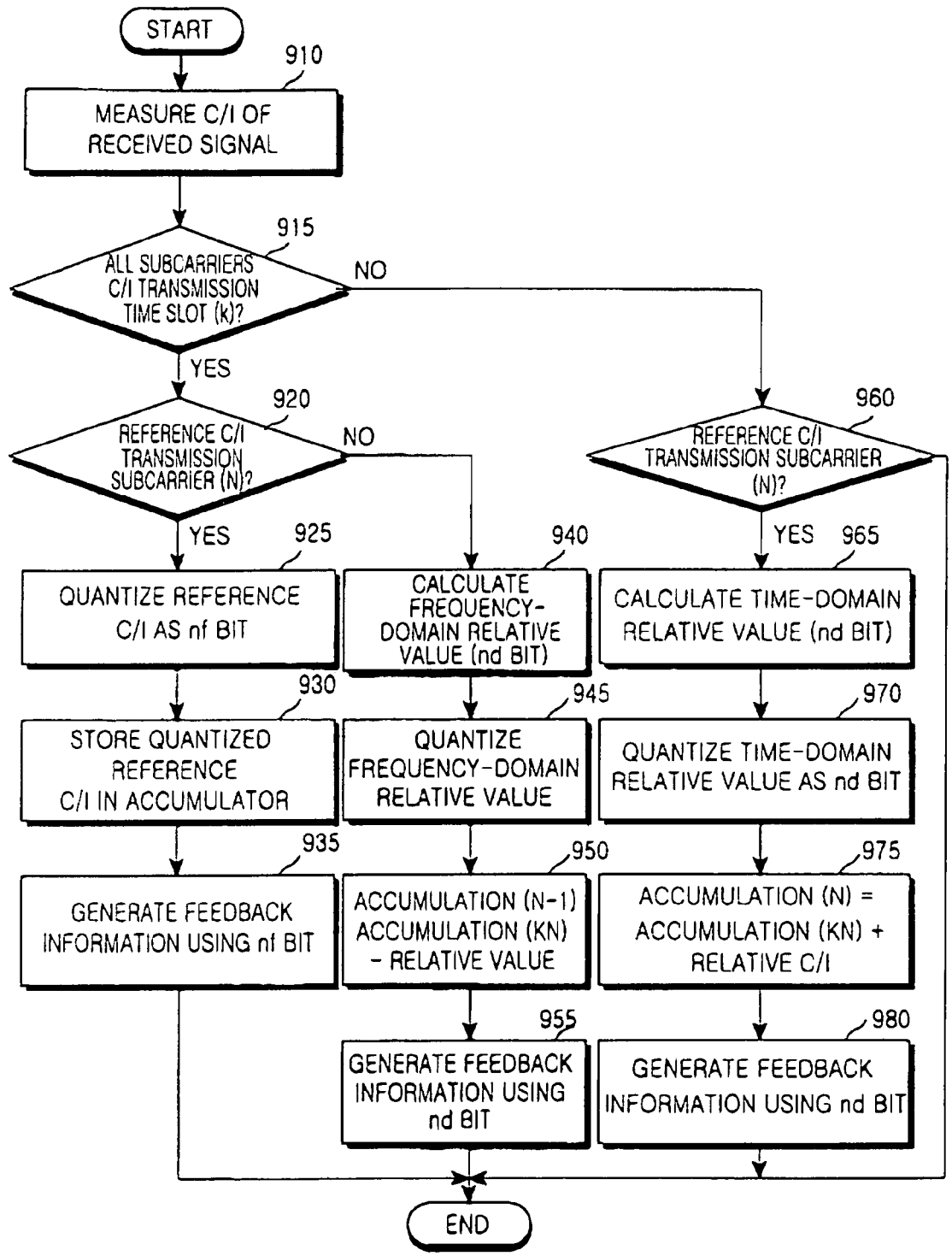
FIG. 9 is a flowchart illustrating a procedure for generating feedback information in a mobile station according to a third embodiment of the present invention.

FIG. 9 is a flowchart illustrating a procedure for generating feedback information in a mobile station according to the third embodiment of the present invention. Referring to FIGS. 1 and 9, a mobile station measures C/I values of subcarriers in a given coherence bandwidth using a received signal through the forward link channel estimator 110 in step 910, and provides the measured C/I values to the feedback information generator 120. The feedback information generator 120 then receives the measured C/I values, and estimates C/I values of subcarriers in a given coherence bandwidth using a received signal. In step 915, the feedback information generator 120 determines whether a current time slot, i.e., a slot #k, is a time slot at which C/I values of all subcarriers in the coherence bandwidth should be transmitted. Here, the time slot at which C/I values of all subcarriers are transmitted can be appropriately set taking a channel condition into consideration.

If it is determined in step 915 that the current time slot is a time slot at which C/I values of all subcarriers are transmitted, the feedback information generator 120 determines in step 920 whether a corresponding subcarrier is a subcarrier transmitting a reference C/I. If it is assumed that the subcarrier transmitting a reference C/I value is an $N^{th}$ subcarrier, the $N^{th}$ subcarrier can be set using a particular subcarrier representative of a channel condition within the coherence bandwidth. If the corresponding subcarrier is a subcarrier transmitting a reference C/I, the feedback information generator 120 quantizes a C/I value of the subcarrier transmitting a reference C/I as a predetermined bit, or 'nf' bit, in step 925, and then stores the quantized C/I value in an accumulator in step 930. In step 935, the feedback information generator 120 generates feedback information using the value, i.e., 'nf' bit, stored in the accumulator.

However, if it is determined in step 920 that the corresponding subcarrier is not a subcarrier transmitting a reference C/I, the feedback information generator 120 calculates in step 940 a difference between a C/I value of an $N^{th}$ subcarrier, which is a value previously stored in the accumulator, and a C/I value of an $(N-1)^{th}$ subcarrier in order to calculate a frequency-domain relative C/I. The feedback information generator 120 quantizes the calculated difference value as a predetermined bit, i.e., 'nd' bit, in step 945, and updates the value stored in the accumulator by adding the quantized difference value to the value previously stored in the accumulator in step 950. In step 955, the feedback information generator 120 generates feedback information using the value, i.e., 'nd' bit, stored in the accumulator.

However, if it is determined in step 915 that the current time slot is not a time slot at which C/I values of all subcarriers in the coherence bandwidth are transmitted, the feedback information generator 120 determines in step 960 whether a corresponding subcarrier is a subcarrier transmitting a reference C/I. If the corresponding subcarrier is a subcarrier transmitting a reference C/I, the feedback information generator 120 calculates in step 965 a difference value between a value previously stored in the accumulator and a C/I estimated at the current time slot in order to calculate a time-domain relative C/I. The feedback information generator 120 quantizes the calculated difference value as a predetermined bit, i.e., 'nd' bit, in step 970, and updates the value stored in the accumulator by adding the calculated difference value to the value previously stored in the accumulator in step 975. In step 980, the feedback information generator 120 generates feedback information using the value, i.e., 'nd' bit, stored in the accumulator.

Here, the value previously stored in the accumulator becomes different depending on whether a frequency-domain relative value is used or a time-domain relative value is used. It should be noted that when the time-domain relative value is used, the value previously stored in the accumulator is the same as that described in the first embodiment.

However, in step 960, if the corresponding subcarrier is not a subcarrier transmitting a reference C/I, the procedure ends.

Figure 10:
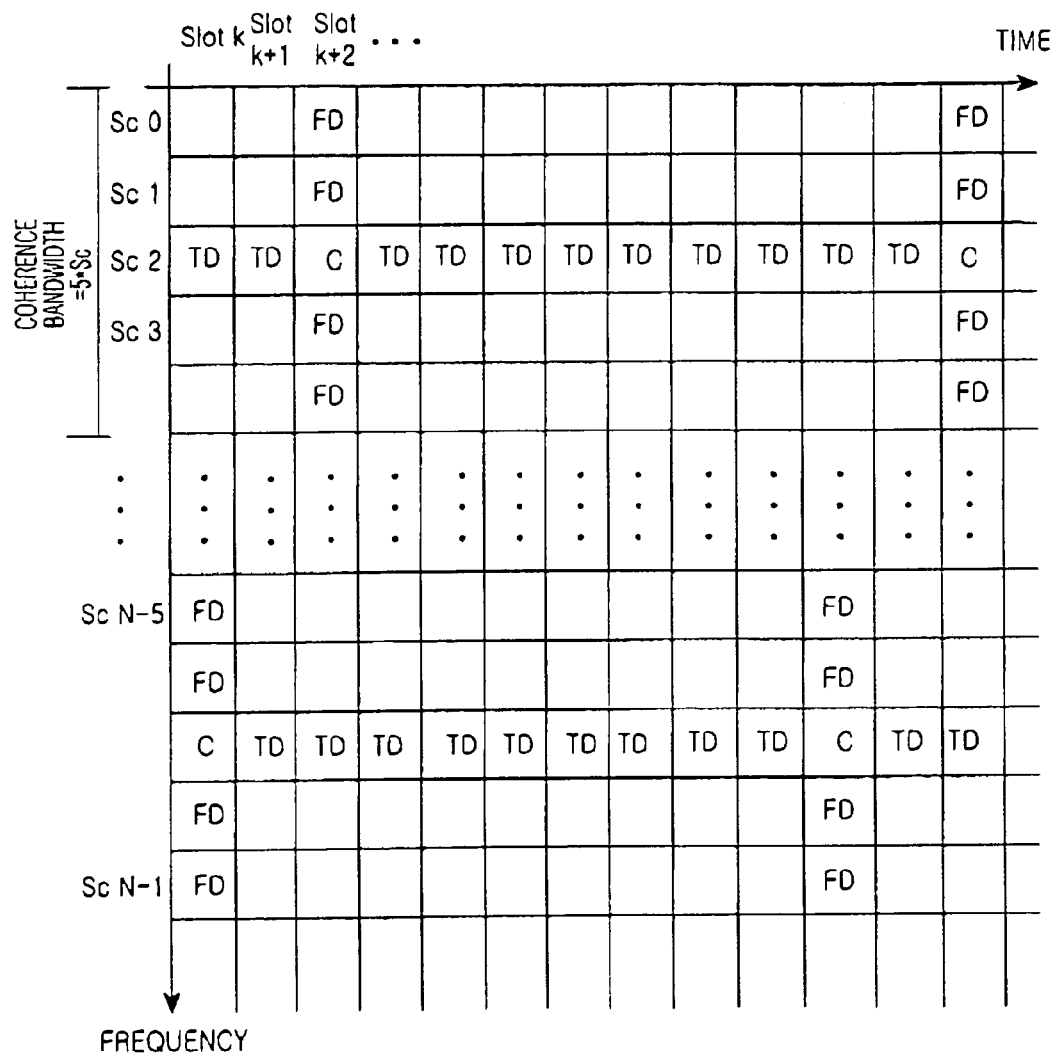
FIG. 10 is a diagram illustrating an example of feedback information generated according to the third embodiment of the present invention.

FIG. 10 is a diagram illustrating an example of feedback information generated according to the third embodiment of the present invention. The feedback information illustrated in FIG. 10 is generated using the coherence bandwidth and the frequency-domain/time-domain relative values. Here, the method for generating the feedback information using the time-domain relative value, i.e., TD value, has already been described. In addition, because the subcarriers in the coherence bandwidth fail to have the same channel conditions, feedback information is generated by taking the difference between channel conditions of subcarriers in the coherence bandwidth into consideration.

Referring to FIG. 10, when a reference C/I is transmitted over a $3^{rd}$ subcarrier, a frequency-domain relative C/I, or FD, of a $2^{nd}$ subcarrier is determined by calculating a difference between a quantized C/I of the $3^{rd}$ subcarrier and an estimated C/I of the $2^{nd}$ subcarrier. Such a frequency-domain relative C/I is quantized and used as feedback information of the $2^{nd}$ subcarrier. A frequency-domain relative C/I a $1^{st}$ subcarrier is determined by subtracting a measured C/I of the $1^{st}$ subcarrier from a value determined by adding a quantized frequency-domain relative C/I of the $2^{nd}$ subcarrier to a quantized C/I of the $3^{rd}$ subcarrier. Such a frequency-domain relative C/I is quantized and used as feedback information of the $1^{st}$ subcarrier.

Likewise, when a reference C/I is transmitted over the $3^{rd}$ subcarrier, relative C/Is of $4^{th}$ and $5^{th}$ subcarriers are calculated in the same method as the method used in calculating the relative C/I of the $1^{st}$ subcarrier. That is, in the example illustrated in FIG. 10, a reference subcarrier like the $3^{rd}$ subcarrier should be appointed in determining a relative value of a subcarrier. This must be prescribed in both the base station and the mobile station. In addition, a relative C/I of each subcarrier is sequentially calculated from a reference subcarrier located closest thereto.

In FIG. 10, at a time slot at which a frequency-domain relative value is not transmitted, a correlation between a variation in channel condition of a reference subcarrier and a variation in channel conditions of surrounding subcarriers is considerably high. Therefore, it is not necessary to transmit the frequency-domain relative value every slot. That is, it is allowable to transmit the frequency-domain relative values at intervals of predetermined number of slots.

It should be noted that FIG. 10 illustrates a method of transmitting a frequency-domain relative value every $10^{th}$ slot, by way of example. In addition, it is not necessary to transmit a time-domain relative value every slot, and also, it is not necessary to transmit frequency-domain relative values of all subcarriers.

FIG. 11 is a diagram illustrating another example of feedback information generated according to the third embodiment of the present invention. The example illustrated in FIG. 11 represents an extended feedback information format for a forward channel condition, generated using the coherence bandwidth and the frequency-domain/time-domain relative values. Such a feedback information format according to another example of the third embodiment, unlike that illustrated in FIG. 10, can transmit a frequency-domain or time-domain relative value at a time slot where a frequency-domain relative value is not transmitted. Whether a frequency-domain relative value is to be used or a time-domain relative value is to be used is determined in consideration of variation levels of channel conditions in the time domain and the frequency domain, and reliability of feedback information. Further, the base station and the mobile station should know the results.

Whether the frequency-domain relative value is to be used or the time-domain relative value is to be used must be prescribed between the base station and the mobile station. Also, it is not necessary to transmit a time-domain relative value every slot, and it is not necessary to transmit frequency-domain relative values of all subcarriers.

Figure 12:
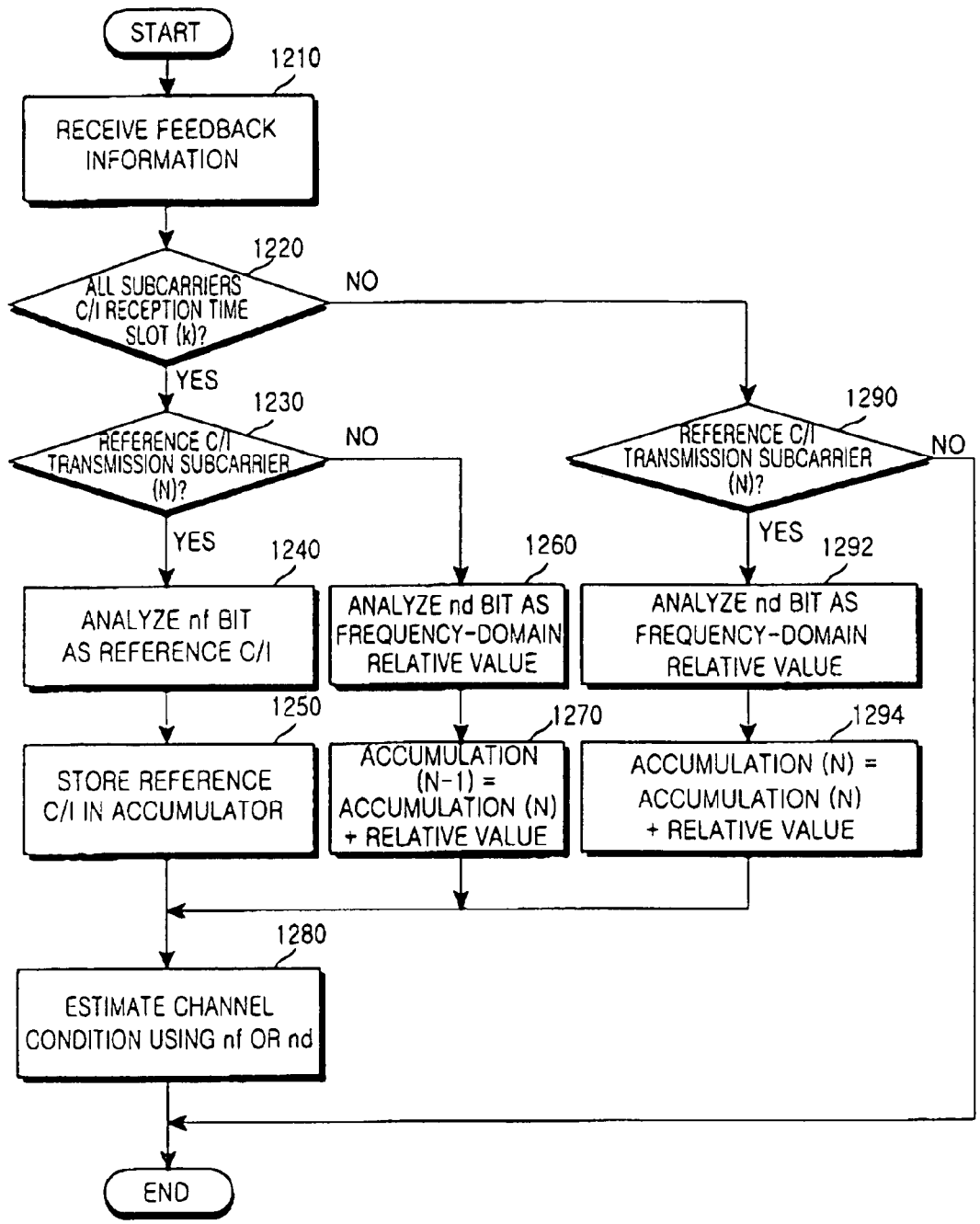
FIG. 12 is a flowchart illustrating a procedure for estimating a forward channel condition in a base station according to the third embodiment of the present invention.

FIG. 12 is a flowchart illustrating a procedure for estimating a forward channel condition in a base station according to the third embodiment of the present invention. Referring to FIGS. 2 and 12, a base station receives feedback information from a mobile station through the feedback channel receiver 210, and delivers the received feedback information to the feedback information analyzer 220.

The feedback information analyzer 220 receives the feedback information in step 1210, and determines in step 1220 whether a current time slot, or a slot #k, is a time slot at which C/I values of all subcarriers in the coherence bandwidth are received. If it is determined that the current time slot is a time slot at which C/I values of all subcarriers are received, the feedback information analyzer 220 determines in step 1230 whether a corresponding subcarrier is a subcarrier transmitting a reference C/I. If it is determined that the corresponding subcarrier is a subcarrier transmitting a reference C/I, the feedback information analyzer 220 analyzes a C/I value ('nf' bit) of the received subcarrier as a reference C/I value in step 1240, and stores the reference C/I value in an accumulator in step 1250. In step 1280, the feedback information analyzer 220 estimates a channel condition using the value, i.e., 'nf' bit stored in the accumulator.

However, if it is determined in step 1230 that the corresponding subcarrier is not a subcarrier transmitting a reference C/I, the feedback information analyzer 220 analyzes a C/I value ('nd' bit) of the received subcarrier as a frequency-domain relative value of the reference C/I value in step 1260, and updates a value stored in the accumulator by adding the frequency-domain relative value to the value previously stored in the accumulator in step 1270. In step 1280, the feedback information analyzer 220 estimates a channel condition using the value, i.e., 'nd' bit, stored in the accumulator.

However, if it is determined in step 1220 that the current time slot is not a time slot at which C/I values of all subcarriers in the coherence bandwidth are received, the feedback information analyzer 220 determines in step 1290 whether a corresponding subcarrier is a subcarrier transmitting a reference C/I. If it is determined that the corresponding subcarrier is not a subcarrier transmitting a reference C/I, the procedure ends. However, if it is determined that the corresponding subcarrier is a subcarrier transmitting a reference C/I, the feedback information analyzer 220 analyzes a C/I value ('nd' bit) of the received subcarrier as a frequency-domain relative value in step 1292, and updates a value stored in the accumulator by adding the frequency-domain relative value to the value previously stored in the accumulator in step 1294. In step 1280, the feedback information analyzer 220 estimates a forward channel condition using the value, i.e., 'nd' bit, stored in the accumulator.

As described above, when feeding back a channel condition of each subcarrier to a base station in order to use an adaptive transmission technique, the present invention uses coherence bandwidth information and time-domain/frequency-domain relative values to reduce an amount of feedback information, thereby preventing a decrease in efficiency of a reverse link.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for estimating a channel condition of a forward link by a mobile station in a mobile communication system including the mobile station and a base station for transmitting and receiving data using a plurality of subcarriers having mutual orthogonality, the method comprising the steps of:
   measuring carrier-to-interference ratio (C/I) values of the plurality of subcarriers using a signal received from the base station;
   determining a subcarrier from the plurality subcarriers for transmitting feedback information in a given coherence bandwidth;
   generating the feedback information of the subcarrier; and
   transmitting the generated feedback information to the base station for estimating the channel condition of the forward link.

2. The method of claim 1, wherein the step of generating the feedback information of the subcarrier comprises the steps of:
   determining whether a current time slot is a reference C/I transmission time slot; and
   generating the feedback information according to a predetermined bit obtained by quantizing a C/I value measured at the current time slot, if the current time slot is the reference C/I transmission time slot.

3. The method of claim 2, further comprising the steps of:
   calculating a difference value between a previously stored value and the C/I value measured at the current time slot, if the current time slot is not the reference C/I transmission time slot; and
   generating the feedback information according to a predetermined bit obtained by quantizing the calculated difference value.

4. The method of claim 3, further comprising the step of updating the previously stored value by adding the calculated difference value to the previously stored value.

5. The method of claim 1, wherein the feedback information includes an average C/I value in the coherence bandwidth.

6. The method of claim 1, wherein the given coherent bandwidth is a frequency bandwidth where a forward channel condition has a predetermined correlation.

7. The method of claim 1, wherein transmitting the generated feedback information to the base station for estimating the channel condition of the forward link comprising the steps of:
   converting the digital signal of the generated feedback information to a baseband analog signal;
   upconverting the baseband signal to an RF signal;
   transmitting the RF signal including the feedback information to the base station.

8. A method for estimating a channel condition of a forward link by a mobile station in a mobile communication system including the mobile station and a base station for transmitting and receiving data using a plurality of subcarriers having mutual orthogonality, the method comprising the steps of:
   estimating carrier-to-interference ratio (C/I) values of the plurality of subcarriers using a signal received from the base station;
   generating feedback information using the estimated C/I values according to whether a current time slot is a time slot at which C/I values of all subcarriers in a given coherence bandwidth are transmitted; and
   transmitting the generated feedback information to the base station for estimating the channel condition of the forward link.

9. The method of claim 8, wherein the step of generating the feedback information comprises the steps of:
   determining whether a current subcarrier is a subcarrier for transmitting a reference C/I, if the current time slot is the time slot at which the C/I values of all the subcarriers in the given coherence bandwidth are transmitted; and
   generating the feedback information according to a predetermined bit obtained by quantizing a C/I value of a subcarrier for transmitting the reference C/I, if the current subcarrier is the subcarrier for transmitting the reference C/I.

10. The method of claim 9, further comprising the steps of:
    calculating a difference between a previously stored value and a C/I value of the subcarrier, if the current subcarrier is not the subcarrier transmitting the reference C/I; and
    generating the feedback information according to a predetermined bit obtained by quantizing the calculated difference value.

11. The method of claim 10, further comprising the step of updating the previously stored value by adding the quantized difference value to the previously stored value.

12. The method of claim 8, wherein the step of generating the feedback information comprises the steps of:
    calculating a difference value between a previously stored value and the C/I value measured at the current time slot, if the current time slot is not the time slot at which the C/I values of all the subcarriers in the given coherence bandwidth are transmitted; and generating the feedback information according to a predetermined bit obtained by quantizing the calculated difference value.

13. The method of claim 12, further comprising the step of updating the previously stored value by adding the quantized difference value to the previously stored value.

14. The method of claim 8, wherein the given coherent bandwidth is a frequency bandwidth where a forward channel condition has a predetermined correlation.

15. The method of claim 8, wherein transmitting the generated feedback information to the base station for estimating the channel condition of the forward link comprising the steps of:
converting the digital signal of the generated feedback information to a baseband analog signal;
upconverting the baseband signal to an RF signal;
transmitting the RF signal including the feedback information to the base station.

16. A method for estimating a channel condition of a forward link by a mobile station in a mobile communication system including the mobile station and a base station for transmitting and receiving data using a plurality of subcarriers having mutual orthogonality, the method comprising the steps of:
measuring carrier-to-interference ratio (C/I) values of the plurality of subcarriers using a signal received from the base station;
determining whether a current time slot of a subcarrier is a reference C/I transmission time slot;
generating the feedback information using a reference C/I value of the subcarrier, if the current time slot of the subcarrier is the reference C/I transmission time slot;
transmitting the generated feedback information to the base station for estimating the channel condition of the forward link;
calculating a difference value between a previously stored value and the C/I value measured at the current time slot, if the current time slot of the subcarrier is not the reference C/I transmission time slot; and
generating the feedback information according to a predetermined bit obtained by quantizing the calculated difference value.

17. The method of claim 16, further comprising the step of updating the previously stored value by adding the calculated difference value to the previously stored value.

18. The method of claim 16, wherein transmitting the generated feedback information to the base station for estimating the channel condition of the forward link comprising the steps of:
converting the digital signal of the generated feedback information to a baseband analog signal;
upconverting the baseband signal to an RF signal;
transmitting the RF signal including the feedback information to the base station.

19. A method for estimating a channel condition of a forward link by a base station in a mobile communication system including a mobile station and the base station for transmitting and receiving data using a plurality of subcarriers having mutual orthogonality, the method comprising the steps of:
receiving feedback information from the mobile station over a feedback channel;
analyzing carrier-to-interference ratio (C/I) values of subcarriers in a given coherence bandwidth using the received feedback information; and
estimating the channel condition of the forward link using analyzed C/I values.

20. The method of claim 19, further comprising step of updating an accumulation value for estimating a channel condition of the forward link based on the analysis result.

21. The method of claim 19, wherein the step of analyzing carrier-to-interference ratio (C/I) values of subcarriers in a given coherence bandwidth using the received feedback information comprises the steps of:
analyzing a C/I value of a subcarrier receiving a reference C/I, if a current time slot is a time slot at which C/I values of all subcarriers in the coherence bandwidth are received, and if a current subcarrier is a subcarrier receiving the reference C/I; and
storing the analyzed C/I value as an accumulation value for estimating the channel condition of the forward link.

22. The method of claim 19, further comprising the steps of:
analyzing a C/I value of the received subcarrier as a frequency-domain relative value of the reference C/I, if the current subcarrier is not a subcarrier receiving the reference C/I; and
updating the previously stored accumulation value by adding the frequency-domain relative value to the previously stored accumulation value.

23. The method of claim 19, wherein the step of analyzing carrier-to-interference ratio (C/I) values of subcarriers in a given coherence bandwidth using the received feedback information comprises the steps of:
analyzing a C/I value of the received subcarrier as a time-domain relative value, if, under the preset condition, the current time slot is not a time slot at which C/I values of all subcarriers in the coherence bandwidth are received, and if a current subcarrier is a subcarrier receiving the reference C/I; and
updating a previously stored accumulation value by adding the time-domain relative value to the previously stored accumulation value.

24. The method of claim 19, wherein the given coherent bandwidth is a frequency bandwidth where a forward channel condition has a predetermined correlation.

25. The method of claim 19, wherein the receiving feedback information from the mobile station over a feedback channel is comprising the steps of:
receiving an RF signal including the feedback information by an antenna;
downconverting the RF signal to a baseband signal; and
converting the baseband signal to a digital signal.

26. The method of claim 19, wherein the step of analyzing carrier-to-interference ratio (C/I) values of subcarriers in a given coherence bandwidth using the received feedback information is comprising the steps of:
analyzing a C/I value of a subcarrier receiving a reference C/I, if a current subcarrier is a subcarrier receiving the reference C/I; and
storing the analyzed C/I value as an accumulation value for estimating the channel condition of the forward link.

27. A method for estimating a channel condition of a forward link by a base station in a mobile communication system including a mobile station and the base station for transmitting and receiving data using a plurality of subcarriers having mutual orthogonality, the method comprising the steps of:
determining whether a current time slot of a subcarrier is a reference C/I transmission time slot;

receiving feedback information using a reference C/I value of the subcarrier, if the current time slot of the subcarrier is the reference C/I transmission time slot;

estimating the channel condition of the forward link using analyzed C/I values; and receiving feedback information using a difference value between a previously stored value and the C/I value measured at the current time slot, if the current time slot of the subcarrier is not the reference C/I transmission time slot.

28. The method of claim 27, further comprising the step of updating the previously stored value by adding the calculated difference value to the previously stored value.

29. The method of claim 27, further comprising the steps of:

receiving a RF signal including the feedback information by an antenna;

downconverting the RF signal to a baseband signal; and converting the baseband signal to digital signal.

30. An apparatus for estimating a channel condition of a forward link by a mobile station in a mobile communication system including the mobile station and a base station for transmitting and receiving data using a plurality of subcarriers having mutual orthogonality, comprising:

a forward link channel estimator for estimating carrier-to-interference ratio (C/I) values of the subcarriers using a received signal;

a feedback information generator for generating the feedback information of a subcarrier to be transmitted by determining whether a current time slot of the subcarrier in a given coherence bandwidth is a reference C/I transmission time slot, and generating the feedback information using a reference C/I value at the current time slot, if the current time slot of the subcarrier is the reference C/I transmission time slot; and a feedback channel for transmitting the generated feedback information to the base station for estimating the channel condition of the forward link.

31. The apparatus of claim 30, wherein the given coherent bandwidth is a frequency bandwidth where a forward channel condition has a predetermined correlation.

32. The apparatus of claim 30, wherein the feedback information generator further comprises the steps of:

calculating a difference value between a previously stored value and the C/I value measured at the current time slot, if the current time slot of the subcarrier is not the reference C/I transmission time slot; and generating the feedback information according to the calculated difference value.

33. An apparatus for estimating a channel condition of a forward link by a mobile station in a mobile communication system including the mobile station and a base station for transmitting and receiving data using a plurality of subcarriers having mutual orthogonality, comprising:

a forward link channel estimator for estimating carrier-to-interference ratio (C/I) values of the subcarriers using a received signal;

a feedback information generator for generating the feedback information of a subcarrier to be transmitted by determining whether a current subcarrier is a subcarrier for transmitting a reference C/I, if the current time slot is the time slot at which the C/I values of all the subcarriers in the given coherence bandwidth are transmitted, and generating the feedback information using a reference C/I value of a subcarrier for transmitting the reference C/I, if the current subcarrier is the subcarrier for transmitting the reference C/I; and a feedback channel for transmitting the generated feedback information to the base station for estimating the channel condition of the forward link.

34. The apparatus of claim 33, wherein the given coherent bandwidth is a frequency bandwidth where a forward channel condition has a predetermined correlation.

35. The apparatus of claim 33, wherein the feedback information generator further comprises the steps of:

calculating a difference between a previously stored value and a C/I value of the subcarrier, if the current subcarrier is not the subcarrier transmitting the reference C/I; and generating the feedback information using the calculated difference value.

36. An apparatus for estimating a channel condition of a forward link by a base station in a mobile communication system including a mobile station and the base station for transmitting and receiving data using a plurality of subcarriers having mutual orthogonality, comprising:

a feedback channel receiver for receiving feedback information using carrier to interference ratio (C/I) value from the mobile station over a feedback channel; and a feedback information analyzer for estimating C/I values of the subcarriers according to a preset condition and estimating the channel condition of the forward link, wherein the feedback information is a reference C/I value of a subcarrier generated in the reference C/I transmission time slot in a given coherence bandwidth.

37. The apparatus of claim 36, wherein the feedback information is difference C/I values of the subcarriers between a previously stored value and the C/I value measured at the current time slot in a given coherence bandwidth.

38. The apparatus of claim 36, wherein the given coherent bandwidth is a frequency bandwidth where a forward channel condition has a predetermined correlation.

39. An apparatus for estimating a channel condition of a forward link by a base station in a mobile communication system including a mobile station and the base station for transmitting and receiving data using a plurality of subcarriers having mutual orthogonality, comprising:

a feedback channel receiver for receiving feedback information using carrier to interference ratio (C/I) value from the mobile station over a feedback channel; and a feedback information analyzer for estimating C/I values of the subcarriers according to a preset condition and estimating the channel condition of the forward link, wherein the feedback information includes a reference C/I value of one subcarrier generated in the reference C/I transmission time slot and difference C/I values of others subcarrier between a previously stored value and the C/I value measured at the current time slot in a given coherence bandwidth.

40. The apparatus of claim 39, wherein the given coherent bandwidth is a frequency bandwidth where a forward channel condition has a predetermined correlation.

41. The apparatus of claim 39, wherein a feedback channel receiver is comprising:

an antenna for receiving a RF signal including the feedback information by an antenna;

a RF processor for downconverting the RF signal to a baseband signal; and an analog to digital converter for converting the baseband signal to digital signal.

* * * * *